April 28, 1959  TAKAHIRO TAKEUCHI  2,884,264
PIPE COUPLING HAVING A GASKET RESPONSIVE
TO INTERNAL OR EXTERNAL PRESSURE
Filed Feb. 26, 1958

INVENTOR
TAKAHIRO TAKEUCHI,

BY *James M. Drysdale*
ATTORNEY

United States Patent Office 2,884,264
Patented Apr. 28, 1959

2,884,264

PIPE COUPLING HAVING A GASKET RESPONSIVE TO INTERNAL OR EXTERNAL PRESSURE

Takahiro Takeuchi, Takaoka Gun, Kochi Ken, Japan

Application February 26, 1958, Serial No. 717,645

1 Claim. (Cl. 285—110)

This invention relates to new and useful improvements in couplings for tubes or pipes and more particularly to a coupling for a pipe which consists of a pair of grooved metal parts which are detachable freely and also are provided with a sufficiently thick packing of rubber or like material inserted in between the grooves that are devised in the linked parts for that purpose.

In the ordinary pipe couplings presently in use in pipes for drawing and draining water such as for example, the pipes in use for fire-extinguishing pumps and the like, the pair of metal parts are closely linked and packed so that they jointly prevent the influx of air or the leakage of water resulting naturally in the unhindered process of drawing and draining water.

However, when the rubber packing loses its power of resilience after being in use for some time, there is bound to occur leakages due to the influx of air or water and the ordinary coupling is found to be inadequate for linking the ordinary pipes.

One object of the present invention is to provide an improvement on existing pipe couplings wherein a triangular shaped groove is created in the two linking male and female metal parts, the apex of the groove being in the male metal part and the base of the groove being in the female metal part and a packing of resilient material such as rubber or plastic stuffed within the triangular shaped groove.

The structure of this packing is such that the space in the triangular shaped groove is well filled, with its flap portions which fit closely into the space formed by the two linking male and female metal parts, the flap portions (5 and 6) sloping on respective sides and the base portion supporting the flaps and tightly adhering to the space in the female mould metal part.

A further object of the present invention is to prevent the influx of air in case of drawing water and the leakage of water in case of drainage and thereby it eliminates the cause of any impediment.

A still further object is to ensure durability and convenience for manipulation in the course of producing this kind of coupling for pipes.

Other objects and advantages of the invention will be apparent during the course of the following description.

In the accompanying drawings, forming a part of this application, and in which like numerals are employed to designate like parts throughout the same—

Figure 1:
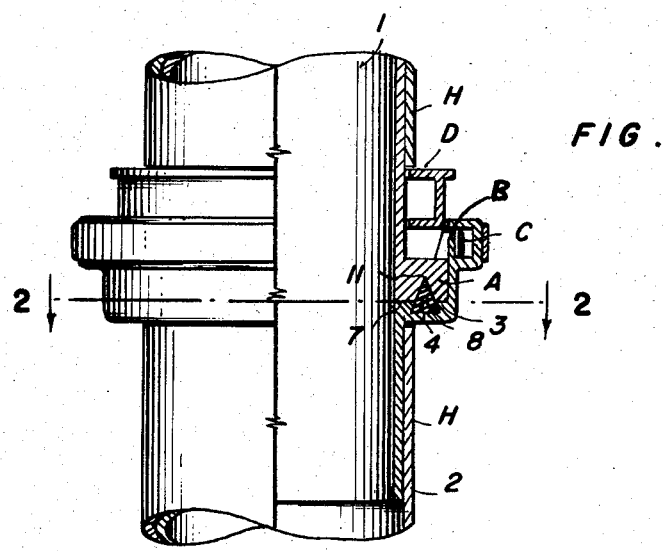
Fig. 1 is a plan view, partly in cross section of the improved pipe coupling.

In Fig. 1 of the drawings, which for the purpose of illustration is shown a preferred embodiment of my invention, the letter H designates the pipe. The coupling consists of a male mold part 1 having fitted thereto a circular body D having a protruding part A having mounted thereon a hook B which may be recoiled by a spring C as shown in Fig. 1. (The minute details of the hook and spring structure have been omitted as they form no part of my invention).

Figure 3:
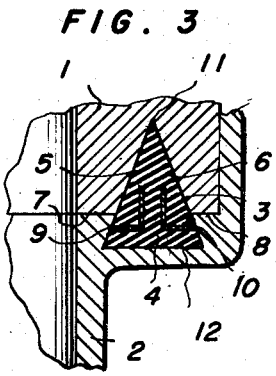
Fig. 3 is an enlarged cross sectional view of the triangular shaped groove or gap 3 which holds the packing and is positioned between the male and female metal parts (1 and 2) of the pipe coupling also shown in cross section.
Figure 2:
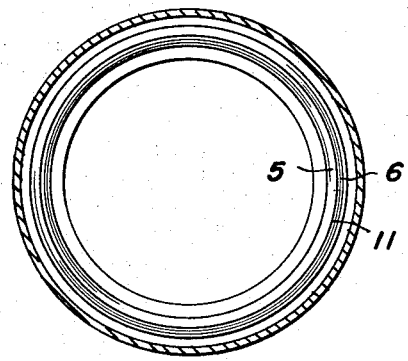
Fig. 2 is a plan view, partly in cross section along the line 2—2 in Fig. 1 looking in the direction of the arrows.

The structure of the pipe coupling is more clearly illustrated in the cross sectional view in Fig. 3 which illustrates the groove 3 to be triangular in shape with its base 4 spreading out and that makes its lower base portion 12 perfectly fitting into its adjacent part and adhering itself without dropping off. The result is that in the case of detaching the male and female mould metal parts (1 and 2) its manipulation is made easy and simple.

The packing is made of rubber or plastic material of a resilient nature shaped in a triangular form so that it fits closely into the space with the flap portions (5 and 6) on either side slanting toward the lower base portion 12 and its apex ending in a sharp angle 11.

Due to this construction, when the male mould part 1 is placed against the female mould part 2, the packing is accurately placed into the groove 3 with ease and firmness and yet without the slightest damage to the packing.

Accordingly, in the case of drawing water, the flap 5 adheres itself to the face 7 as a result of the vacuum influence in the pipe H and the air opposite the face 8 tries to push itself into the space or crevice 10 between the other flap 6 and the base 4.

As illustrated in Fig. 3, the pressure of the incoming air is exerted on the base 4 and consequently on the flap 5, thus, the above explained external pressure exerting its entire force on the face 7 and concurrently on the base 4 against the sides of the groove 3 and thereby perfecting the prevention of the influx of air.

Furthermore, when the base 4 is constructed comparatively taller its apex 11 is slightly indented as a result of pressure both from the male and female mould parts (1 and 2) and that would achieve fully the purpose of closer fitting into the groove 3 with its apex portion 11 and the base portion 12.

The result is more effective in preventing the influx of air through these gaps and successful drawing of water.

Alternatively, in the case of draining water the water passing out of the gap adjacent the face 7 fills itself in the crevice 9 between the flap 5 and the base 4 and the pressure thus created is in turn applied against the face 8, thus removing the possibility of leakage.

In accordance with the same principle, the base 4 of the packing is pressed powerfully against the sides of the groove 3 as caused by the pressure of water and the leakage of water is made impossible.

The present invention is not only aimed at stuffing the groove 3 between the male and female mould metal parts (1 and 2) with resilient material naturally used in packing but also at the employment of the flapping device consisting of the flaps 5 and 6 which derive pressure from air and water as explained in the foregoing paragraph and filling closely the space between the face 7 and the face 8. Thus, even in the event of packing material losing its resilience during use, the possibility of the influx of air or the leakage of water is eliminated and the use of the packing is possible for a longer duration.

As previously pointed out, the pipe coupling of the present invention has the features of packing with a pair of the flaps (5 and 6) slanting on either side of the triangular shape with crevices 9 and 10 that prevents the influx of air in the case of drawing water and the leakage of water in drainage. Moreover, the groove 3 created between and by the male mould part 1 and the female mould part 2 as illustrated in the cross sectional view in Fig. 1 is filled in perfectly with the packing that does not easily drop off yet with its sharpened apex fitting closely in linking the male and female metal mould parts with ease and convenience.

It is obvious that minor changes in the details of construction may be made without departing from the spirit of the invention as set forth in the appended claim.

I claim:

A pipe coupling consisting of a pair of freely detachable male and female metal mould parts, the male metal mould part having a circular body, a triangular shaped groove having its apex in said circular body and the base of the groove being in the female metal part, a packing of resilient material stuffed within the groove and comprising flap portions which fit closely in the space formed by the two linking male and female metal parts, the flap portions sloping on respective sides, the ends of said flap portions being disposed in the groove of said female metal part, a first crevice having an axial portion and a radial portion between one flap portion and the base, a second crevice having an axial portion and a radial portion between the other flap portion and the base the first crevice preventing the influx of air when drawing water, the second crevice preventing the leakage of water in drainage.

References Cited in the file of this patent

UNITED STATES PATENTS

| | | |
|---|---|---|
| 1,210,090 | Markham | Dec. 26, 1916 |
| 1,537,755 | Dowling | May 12, 1925 |
| 2,330,425 | Hilton | Sept. 28, 1943 |
| 2,415,887 | Joy | Feb. 18, 1947 |
| 2,462,493 | Hamer | Feb. 22, 1949 |
| 2,657,825 | Erickson | Nov. 3, 1953 |

FOREIGN PATENTS

| | | |
|---|---|---|
| 406,120 | Great Britain | Feb. 22, 1934 |
| 588,987 | Great Britain | June 9, 1947 |

OTHER REFERENCES

Product Engineering, 1955 Annual Handbook, page J30.